July 27, 1948.  A. KUBIN ET AL  2,446,050
INNER TUBE TESTER

Filed Aug. 6, 1946  2 Sheets-Sheet 1

INVENTORS
Andrew Kubin
Charles Kubin
Andrew Brondos Jr.
BY
ATTORNEYS

INVENTOR.
Andrew Kubin
Charles Kubin
Andrew Brondos Jr.

Patented July 27, 1948

2,446,050

UNITED STATES PATENT OFFICE 2,446,050

INNER TUBE TESTER

Andrew Kubin, Westlake, Charles Kubin, North Olmsted, and Andrew Brondos, Jr., Lakewood, Ohio, assignors to The Reliable Spring & Wire Forms Company, Cleveland, Ohio, a corporation of Ohio Application August 6, 1946, Serial No. 688,670

6 Claims. (Cl. 73—50)

1

This application is a continuation in part of our abandoned application Serial Number 620,452, filed Oct. 5, 1945.

This invention relates to inner tube testing cages of the type in which closely spaced wire loops are connected together to form a tube receiving cage of toroidal form that confines the tube in such a manner as to permit inspection of the entire tube while it is inflated under considerable pressure in order to detect small leaks which would not be noticeable at lower pressures.

This invention has for an object to provide a cage of the character referred to which is strong and durable and which is of simple construction and inexpensive to manufacture.

It is also an object of the invention to provide a tube confining unit in the form of a wire loop that can be assembled with other identical units to form a cage of the desired diameter.

A further object of the invention is to so mount the wire loop units on endless supporting rings that the units are supported in uniformly spaced relation at their inner ends in such manner that the outer portions of the loops are held in properly spaced relation.

An additional object of the invention is to provide a unitary cage composed of two endless flexible rings and tube confining wire loops that are so connected that the loops can be quickly and easily folded to the interior of the rings for shipment or storage and to extended position for use.

With the above and other objects in view, the invention may be said to comprise the cage as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 5 is a side elevation of the cage folded for

Figure 1:
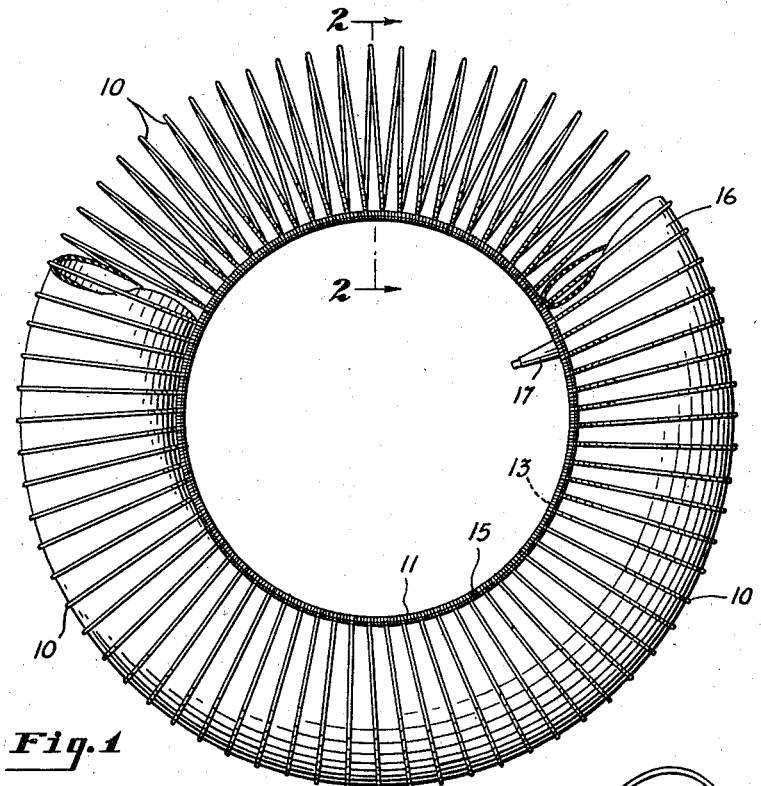
Figure 1 is a side elevation of a cage embodying the invention, showing an inner tube mounted therein.
Figures 2, 3:
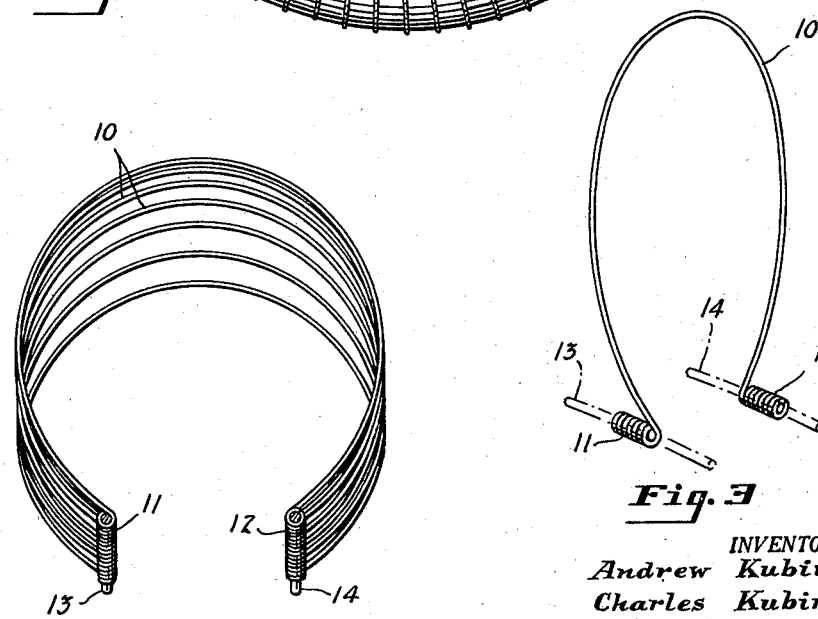
Fig. 2 is a section taken on the line indicated at 2—2 in Fig. 1.
Fig. 3 is a perspective view of one of the wire loop units.

2 shipment or storage showing all of the loops positioned to the interior of the endless supporting rings.

The cage of the present invention is formed by a series of wire loops 10, each of which has helically coiled ends 11 and 12 that consist of a series of convolutions forming tubular end portions that extend substantially normal to the plane of the loop. The coiled tubular portions 11 and 12 are of substantially the same length and preferably extend in opposite directions from the base of the loop 10. The loop 10 is of substantially horseshoe shape and the end portions 11 and 12 are of a size to slidably receive wire rings 13 and 14 which are of the same size and which support the bases of the wire loop units.

The wire loop units are of identical construction and the cages are formed by threading the tubular portions 11 and 12 on wires 13 and 14 with the tubular portions 11 and 12 of adjacent units abutting end to end. After the units are assembled on the wires the wires are bent to circular form and welded as indicated at 15 in Fig. 1 to form parallel endless rings on which the base portions of the loops are mounted.

The wire loop units can be rapidly and cheaply manufactured and may be assembled on ring forming wires of the proper length to form a cage of the desired internal diameter. The tubular coiled ends 11 and 12 of the wire loops provide stiffening braces for the loops which resist angular deflection of the loops and by forming the tubular portions 11 and 12 to extend in opposite directions from the loop, the loops are disposed at small angles to radial planes so that lateral movements of the outer portions of the loops are resisted by the legs of the loops as well as by the stiff end portions 11 and 12.

In order to provide a cage that has considerable rigidity and that will retain its shape despite rough handling, the wire employed in the construction of the cage is preferably a high tensile, high carbon spring wire.

Figure 4:
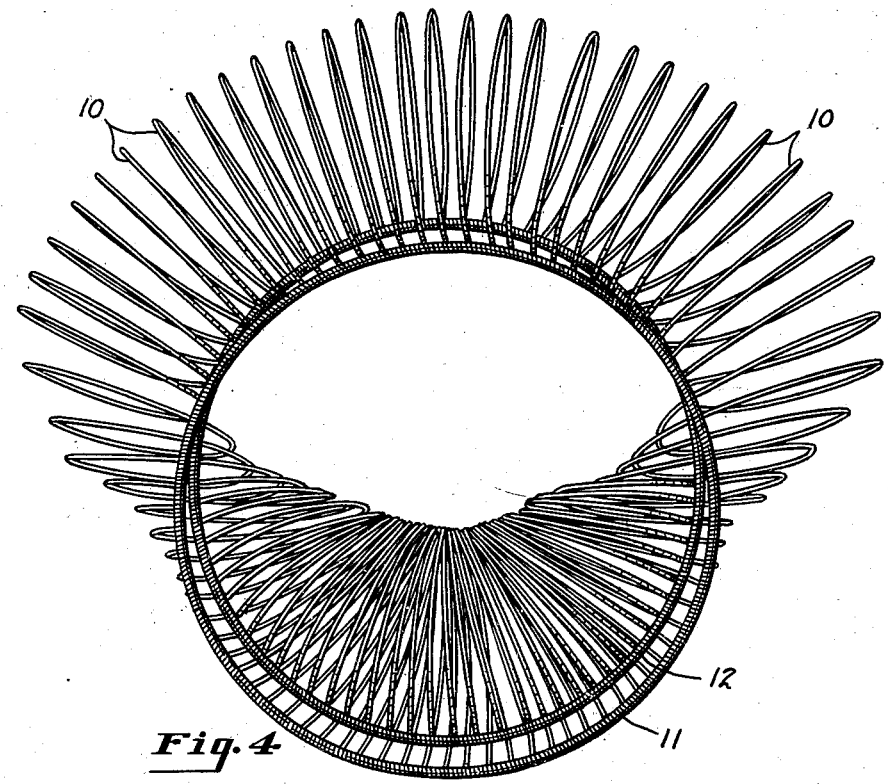
Fig. 4 is a side elevation of the cage showing a portion of the loops folded inwardly and one of the rings extending partially through the other.
Figure 5:
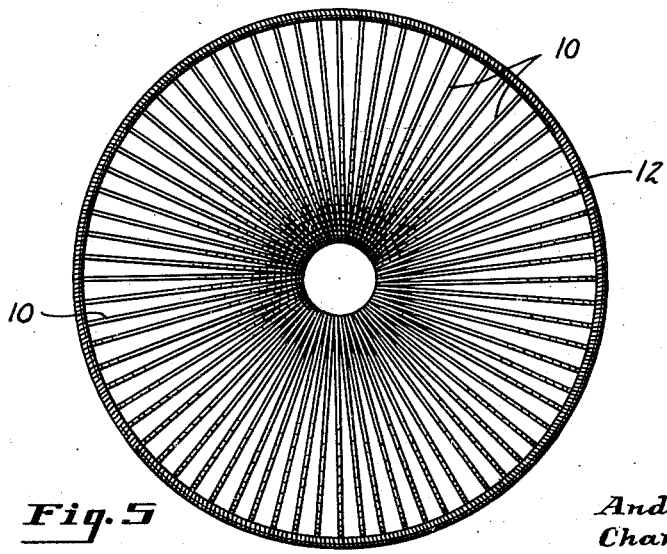

By reason of the fact that the endless wire rings 13 and 14 and loops 10 are formed of spring wire the loops may be readily folded to the interior of the rings 13 and 14 as illustrated in Figs. 4 and 5. By reason of the pivotal connection of the coils 11 and 12 to the wire rings 13 and 14, the coils in any part of the cage may be swung inwardly as shown in Fig. 4 and by reason of the gripping action of the coils 11 and 12 on the rings 13 and 14 the loops will be held in the folded position by the frictional engagement of the coils 11 and 12 with the rings. As the loops are folded inwardly the rings 13 and 14 are gradually elongated and one of the rings begins to pass through the other. As the folding of the loops continues the ring on the side toward which the loops are folded gradually passes through the other ring until the position of the rings is reversed and the loops are all disposed within the rings as shown in Fig. 5.

An inner tube such as the tube 16 shown in Fig. 1 may be inserted through the space between the rings 13 and 14 into the cage with its valve stem 17 projecting through the space between the rings 13 and 14 and the inner tube when inflated within the cage is confined by the closely spaced loops 10 so that considerable internal pressure can be exerted upon the tube without danger of excessive stretching of any portion of the tube. Small leaks in the tube may thus be readily detected since a high inflation pressure will tend to enlarge openings which would not be detectable with low inflation pressures.

It is to be understood that variations and modifications of the specific devices herein shown and described for purposes of illustration, may be made without departing from the spirit of the invention.

What we claim is:

1. A testing cage for inner tubes comprising two laterally spaced rings and a series of circumferentially spaced resilient wire loops having open bases supported at their ends on said rings, each loop comprising a single piece of wire having each of its ends coiled helically to provide an elongated tubular ring receiving end portion disposed substantially normal to the plane of the loop, said tubular end portions of said loops abutting end to end on said rings to uniformly space said loops circumferentially of the cage.

2. A testing cage for inner tubes comprising two laterally spaced rings and a series of circumferentially spaced resilient wire loops having open bases supported at their ends on said rings, each loop comprising a single piece of wire having each of its ends coiled helically to provide an elongated tubular ring receiving end portion disposed substantially normal to the plane of the loop, the tubular portions at opposite ends of each loop extending in opposite directions from said loop, said tubular end portions of said loops abutting end to end on said rings to uniformly space said loops circumferentially of the cage.

3. A wire loop unit for inner tube testing cages comprising a piece of wire bent to form a loop of substantially horseshoe form open at the base and having each of its ends coiled helically to provide an elongated tubular end portion disposed substantially normal to the plane of the loop.

4. A wire loop unit for inner tube testing cages comprising a piece of wire bent to form a loop of substantially horseshoe form open at the base and having each of its ends coiled helically to provide an elongated tubular end portion disposed substantially normal to the plane of the loop, said tubular end portions being of substantially equal length and extending in opposite directions from the base of the loop.

5. A testing cage for inner tubes comprising two laterally spaced rings and substantially equiangularly spaced loops of high tensile, high carbon spring wire, each loop being formed of a piece of wire bent to substantially horseshoe form and having its ends coiled about said rings to provide integral tubular end portions, said loops being arranged with their tubular portions abutting end to end on said rings.

6. A testing cage for inner tubes comprising two laterally spaced rings of substantially equal size and formed of spring wire, and spaced horseshoe shaped loops of spring wire each having oppositely extending helical coils at the ends thereof wrapped about said wire rings, each coil abutting an adjacent loop to space the loops on the rings, said loops being progressively foldable laterally and inwardly about said rings from a position in which they project outwardly from said rings to a position in which they lie entirely within the rings, said rings being sufficiently flexible to permit one ring to be forced laterally through the other during the folding of said loops.

ANDREW KUBIN.
CHARLES KUBIN.
ANDREW BRONDOS, Jr.

REFERENCES CITED

The following references are of record in the file of this patent:

UNITED STATES PATENTS

| Number | Name | Date |
| --- | --- | --- |
| 2,330,972 | Hill | Oct. 5, 1943 |